May 17, 1960     J. HAJART     2,936,807

TIRE CHAIN

Filed June 16, 1958     2 Sheets-Sheet 1

INVENTOR.
JOSEPH HAJART
BY
ATTORNEY

May 17, 1960 J. HAJART 2,936,807
TIRE CHAIN
Filed June 16, 1958 2 Sheets-Sheet 2

INVENTOR.
JOSEPH HAJART
BY
ATTORNEY

United States Patent Office 2,936,807
Patented May 17, 1960

2,936,807
TIRE CHAIN

Joseph Hajart, Denver, Colo.

Application June 16, 1958, Serial No. 742,299

2 Claims. (Cl. 152—225)

This invention is directed to an improved automotive safety device and more particularly to an improved ice and snow tire chain.

Many attempts have been made in the past, mostly without success, to provide a tire chain for use with an automobile which is useful in ice and snow. In the prior art tire chains, it has been found that there is a lack of efficiency in providing a grip on a surface, such as a road, highway and the like, which is covered with ice or snow or both. Further, the prior art tire chains require the use of auxiliary springs and the like to retain the chains on the tire or at least to provide a snug fit and prevent the chains from slapping when the vehicle is in motion. Further, the prior art tire chains of which the applicant is aware do not provide both a forward traction and side-to-side traction.

It is an object of this invention, therefore, to provide an improved ice and snow tire chain for use on a vehicle which avoids one or more of the disadvantages of the prior-art arrangement and which provides an improved side-to-side traction as well as forward traction.

It is a further object of this invention to provide an improved ice and snow tire chain which is adapted for use with a wide variety of tire sizes.

It is still a further object of this invention to provide an improved ice and snow chain which may readily and simply be installed and removed from a tire.

Another object of the invention is to provide an improved ice and snow tire chain which is efficient, simple to manufacture, strong and pleasing to the eye.

In accordance with the invention, the improved ice and snow tire chain comprises a plurality of sections each comprising a plurality of elements hingedly connected in spaced substantially parallel rows with a centrally located pair of opposed elements in each section connected by a cross member. The sections intermediate the end sections are hingedly connected together by means of an adjustable cross member having side wall clamping means depending from each end thereof. Each of the hinged elements and the cross members are provided with at least one traction lug projecting upwardly therefrom.

For a better understanding of the present invention, together with other and further objects thereof, reference is had to the following description taken in connection with the accompanying drawings and its scope will be pointed out in the appended claims.

Figure 1:
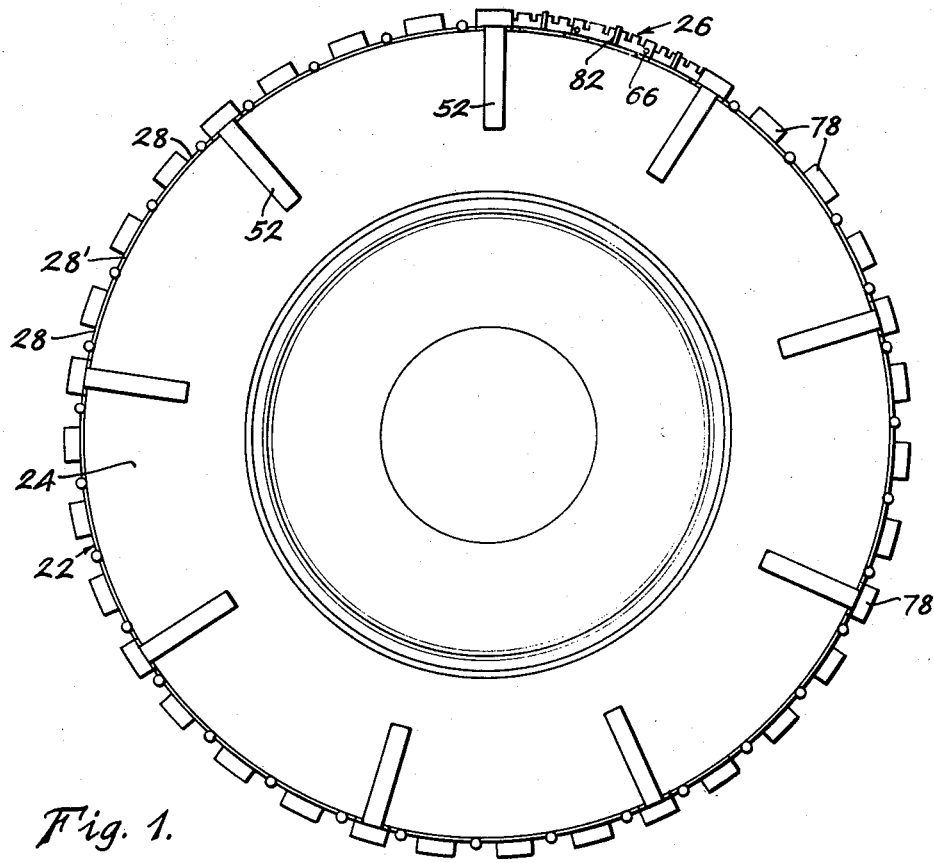
Figure 1 is a side elevation of an automobile tire mounted on a wheel with the ice and snow tire chain installed thereon.
Figure 2:
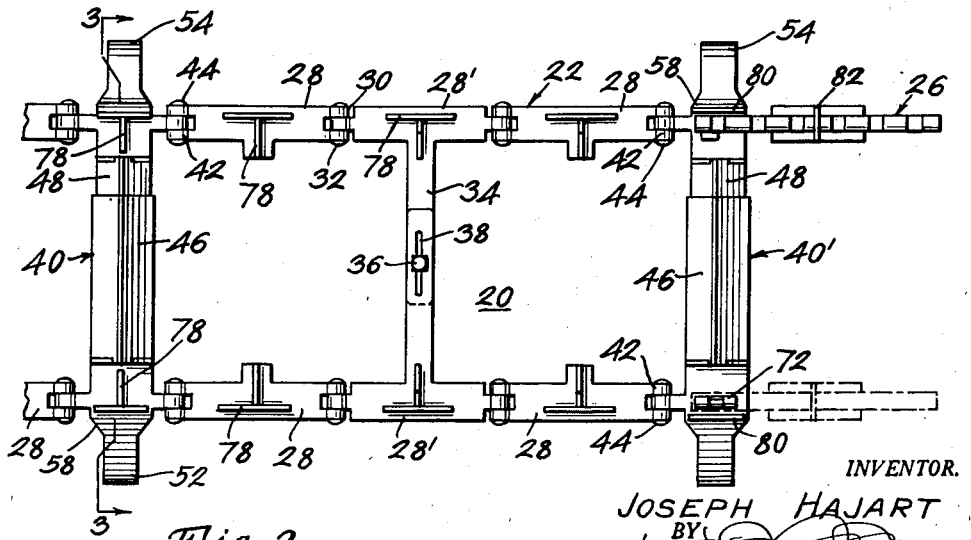
Figure 2 is a plan view of one section of the ice and snow tire chain according to the invention showing means for fastening the end sections together as installed on a tire.
Figure 3:
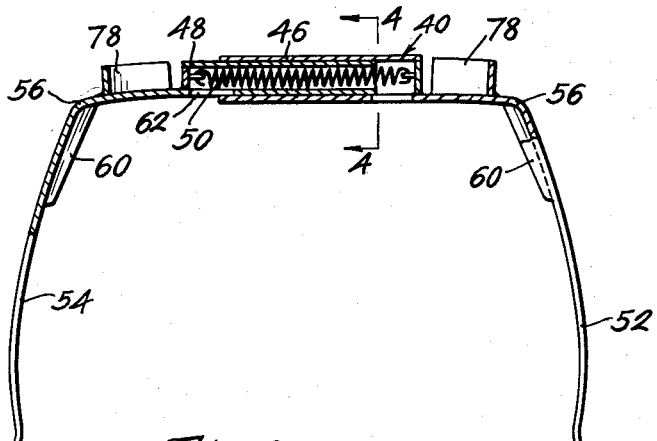
Figure 3 is a view, partly in section, taken along line 3—3 of Figure 2.

Referring to Figure 2 of the drawing, there is shown one section of the ice and snow chain 20 generally represented by numeral 22. The ice and snow chain is made up of a plurality of sections 22, Figure 1, the ends of which are fastened together around a tire 24 by means of fastener section 26. Each section 22 is seen to comprise a plurality of link elements 28 connected together by means of a hinge connection 30 including pin 32. The link elements are arranged in spaced apart substantially parallel rows with the center pair of opposed links 28' being connected by a cross member 34, which may be solid or of adjustable length to be secured by means of a bolt 36 passing through slot 38. The end links of a section are connected to an extensible cross member link 40 by means of a hinged connection 42 and pin 44. The extensible cross member link 40 is seen to include two telescoping parts 46 and 48, which are spring biased toward one another by means of spring 50, Figure 3. The outer ends of telescoping parts are provided with depending substantially arcuate clamping means 52 and 54, respectively extending radially inwardly with respect to the tire 24 and may conveniently comprise an extension of parts 46 and 48 with a bend as at 56. As shown in Figure 2, the clamping means 52 and 54 may be of reduced width with respect to parts 46 and 48 with a tapered portion 58 therebetween. The edges of the tapered portion may be bent inwardly to form a channel as at 60, Figure 3.

Figure 4:
Figure 4 is a cross sectional view taken along line 4—4 of Figure 3.

Referring to Figure 4, the parts 46 and 48 may conveniently be of triangular cross section although they need not be limited thereto. An access opening 62 may be provided adjacent one end of element 48 to facilitate insertion and removal of spring 50.

Figure 5:
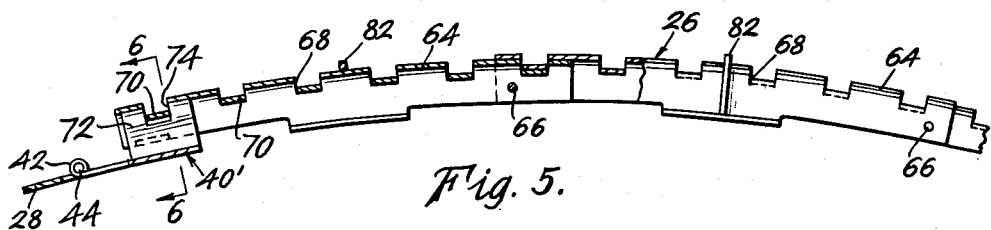
Figure 5 is a side elevation partly in section of the fastening means, a portion of which is shown, in plan, in Figure 2.
Figure 7:
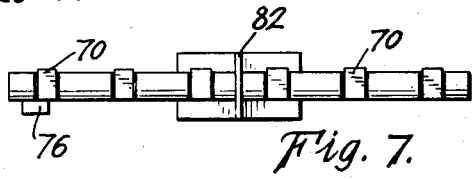
Figure 7 is a plan view of a portion of the fastening means of Figure 5.
Figure 8:
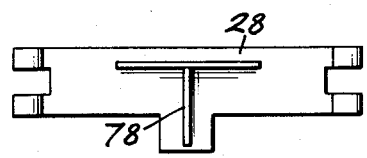
Figure 8 is a plan view of one of the elements of a section showing the upwardly projecting lugs.
Figure 6:
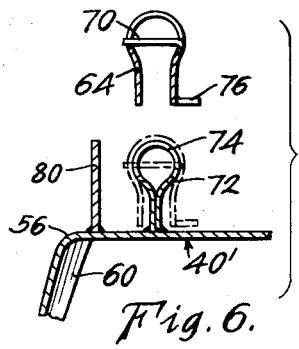
Figure 6 is an exploded view, partly in section, taken along line 6—6 of Figure 5.
Figure 9:
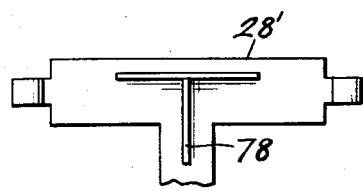
Figure 9 is a plan view, partly broken away to conserve space, of one of a pair of opposed elements centrally located in each section and the connecting cross member; and, Figure 10 is in elevational view of an element as shown in Figure 8 in plan.
Figure 10:
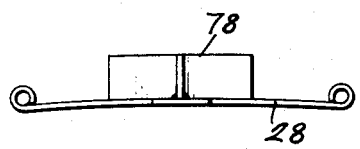

Figure 5 is a view to an enlarged scale of the fastener section 26 of Figure 1, partly in section. The fastener section is seen to comprise a plurality of sections 64 hingedly connected together by means of pins 66. Each section is seen to comprise an inverted substantially U-shaped channel having a plurality of openings 68 along the length thereof formed by providing a pair of slits across the bottom of the U and along one edge and bending the tab 70, Figure 6, across the opening to form a bottom for opening 68 positioned intermediate the top and bottom of the channel. The end extensible cross member link 40' is provided adjacent the wide end of tapered section 58 with a catch 72 secured thereto as by welding or the like. Catch 72 is seen to have a substantially circular cross section at the top which is adapted to mate with the substantially U-shaped channel of fastener sections 64, Figure 6. A notch 74 is provided in the upper surface of catch 72 adapted to receive tab 70 of fastener 64. The legs of the substantially U-shaped section 64 are biased together such that when a tab 70 is urged into notch 74, the fastener is frictionally held against unintentional release. A release tab 76 is provided at intervals along the lower edge of fastener section 64 to facilitate removal thereof from catch 72. Tab 70 in cooperation with notch 74 of catch 72 secures the ends of the chain together in installed position on a tire and the plurality of notches 68 and tabs permits of adjusting the chain length to fit a particular size tire.

Another important aspect of the present invention is that each of links 28, 28' and extensible cross links 40 are provided with a longitudinal and traverse lug, which may conveniently be in the form of a T, 78, secured to the upper surface as by welding or the like to be in ground contacting relation when the chain is installed on a tire. The extensible link 40' is provided with a similar longitudinal lug 80. Intermediate the ends of each fastener link 64 a transverse lug 82 is secured as by welding or the like. These lugs provide for forward traction as well as presenting a substantial deterrent to slipping from side-to-side on snow and ice.

It is to be understood that a greater number of links may be used in each section and in the complete chain where greater traction and flexibility as desired. While three fastener links are shown, a greater or smaller number may be used. As shown in Figure 2, notches may be provided in the traverse portion of lugs 78 in the last section 22 of the chain to accommodate and secure the fasteners 64 when the chain is shortened to fit a tire.

While there has been described what at present is considered to be the preferred embodiment of this invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:
1. An ice and snow tire chain which comprises a plurality of sections each comprising a plurality of link elements hingedly connected in spaced substantially parallel rows with a centrally located opposed pair of hinged elements in each section being connected by a cross member, the sections intermediate the end sections being hingedly connected together by means of an extensible cross member having side wall clamping means depending from each end thereof and each of said hinged elements and said cross members being provided with a traction lug projecting upwardly therefrom on each end, wherein the extensible cross members each comprise a pair of members telescoped together and a spring biasing the pair together.

2. An ice and snow tire chain which comprises a plurality of sections each comprising a plurality of link elements hingedly connected in spaced substantially parallel rows with a centrally located opposed pair of hinged elements in each section being connected by a cross member, the sections intermediate the end sections being hingedly connected together by means of an extensible cross member having side wall clamping means depending from each end thereof and each of said hinged elements and said cross members being provided with a traction lug projecting upwardly therefrom on each end, including means on the end sections for adjustably fastening the ends of the chain together with the chain about a tire, wherein the fastening means comprises in combination a plurality of fastener sections of substantially U-shaped cross section hingedly connected in spaced substantially parallel relation, each having a plurality of openings, along the length thereof, in the U bend thereof with a tab extending between the legs of the U intermediate the U bend and the end of the legs, and a catch secured to the end extensible cross member of the last section of the chain adapted to mate with the interior of the substantially U-shaped fastener sections, having a notch adapted to receive a tab of the fastener sections.

References Cited in the file of this patent
UNITED STATES PATENTS

| | | |
|---|---|---|
| 1,308,705 | Gajan | July 1, 1919 |
| 1,837,708 | Frank | Dec. 22, 1931 |
| 2,775,993 | Young | Jan. 1, 1957 |